United States Patent Office 3,504,188
Patented Mar. 31, 1970

3,504,188
SHIELDED VIDEO 2 x 2 SWITCH

Manfred Karl Ficker, Reesers Summit, Pa., assignor to AMP Incorporated, Harrisburg, Pa.

Filed Sept. 13, 1967, Ser. No. 667,426
Int. Cl. H02j *1/10*
U.S. Cl. 307—18 9 Claims

ABSTRACT OF THE DISCLOSURE

A switch structure is disclosed having an arrangement of shielding and circuit paths to provide isolation between high frequency signal channels. The switch structure is in a 2 x 2 configuration and includes dry reed relays connected to be selectively switched by a control circuit to connect two 75 ohm video input signals onto two 75 ohm output paths.

Background of the invention

Compactness and signal isolation are relatively inconsistent requirements since the latter is most easily obtained by proper spacing between circuit paths to be isolated. When these requirements are applied to a device which must handle high frequencies such as the frequencies utilized to define video signals the basic incompatibility of closely spaced components and good isolation is magnified. As a substitute for physical spacing of circuit paths the prior art has generally turned to the use of shielding made to extend between circuit paths and reference to ground to effectively block leakage radiation from being transmitted from or received by isolated paths. This approach does not altogether answer however, since it cannot be used to provide isolation between the contacts of a switch which must isolate when open but complete a circuit path when closed. The prior art approach to this problem is to provide sufficient spacing between switch contacts to minimize stray capacitance therebetween and the coupling path that stray capacitance offers to RF signals. Contacts which are widely spaced in an open position, however, have an increased closure stroke which in turn limits the closure time and response of the switch. Widely spaced contacts also require greater control signal power which in turn may affect isolation between the switch signals and the control circuit. Finally, widely spaced contacts require heavy contact arms which tend to cause switch bounce.

Underlying all of the foregoing problems including shielding and contact design is the fact that the solution mentioned calls for a rather custom design which is not only more expensive but is frequently less reliable overall because custom engineering cannot afford the kind of quality control employed relative to standardized high production items.

Summary of the invention

The present invention relates to a switch structure capable of providing substantial isolation between signal channels in an assembly which is compact, relatively inexpensive, and formed of standard components. The invention is particularly directed to 2 x 2 switch for video use.

It is an object of the invention to provide a switch assembly which is capable of making or breaking selected signal paths which must handle signals of appreciable frequency with maximum isolation being provided between such channels and with such switch being of a size smaller than heretofore available. It is another object to provide a relatively simple and inexpensive switch structure of standard components capable of switching signals of video frequencies reliably and for long periods of time without requiring maintenance. It is still another object of the invention to provide a shielded 2 x 2 switch which is compact in size and capable of simultaneously and selectively switching two input channels into two output channels.

The foregoing problems are overcome and the foregoing objectives are attained by the invention through the provision of a switch structure utilizing the dry reed relays physically arranged to minimize capacitive coupling between channels relative to a shielding housing A circuit is provided to reduce capacitive coupling across open contacts through the driving coil of the reeds and the signal switching elements including the reeds are physically located apart from the control elements of the circuit which operate to effect switching action.

Description of preferred embodiment of the invention

Figure 5:
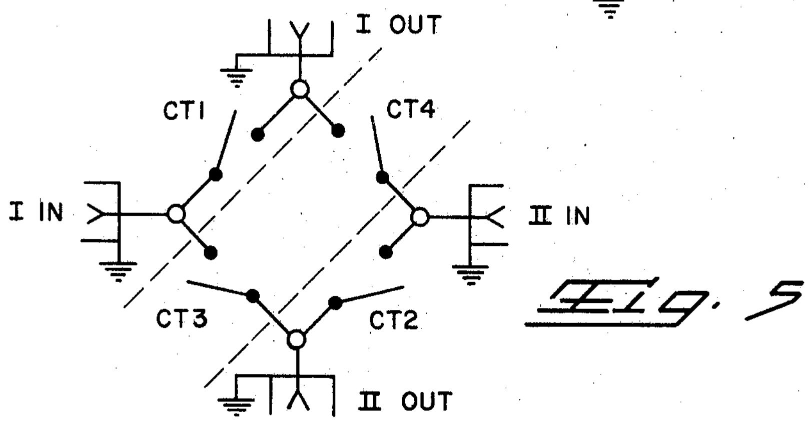
FIGURE 5 is a schematic diagram of the signal channel circuit of the switch of the invention.

Referring first to FIGURE 5 the overall function of the switch device of the invention may be seen to contemplate a selective making and breaking of pairs of switch contacts to connect or disconnect pairs of input channels identified as $I_{IN}$, $II_{IN}$ to pairs of output channels $I_{OUT}$, $II_{OUT}$. The driving coils for the switch contacts shown in FIGURE 5 are connected in a manner to be described to close the contacts CT1 and CT2 connecting $I_{IN}$ to $I_{OUT}$ and $II_{IN}$ to $II_{OUT}$ simultaneously and responsive to the application of a single control signal, the other contacts CT3 and CT4 remaining open. Alternatively, a different control signal is made to close the contacts CT3 and CT4 to connect $I_{IN}$ to $II_{OUT}$ and $II_{IN}$ to $I_{OUT}$. An absence of control signals leaves the contacts in an open condition with no connection between channels.

Figure 1:
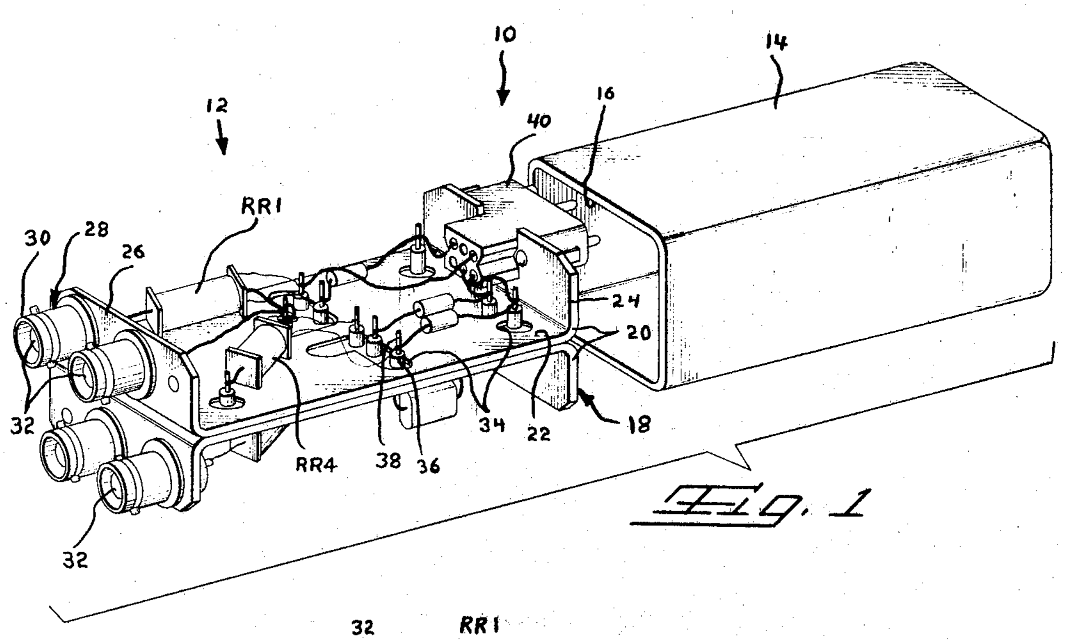
FIGURE 1 is a perspective showing the switch structure of the present invention with an outside shielding can removed.

In the preferred embodiment hereinafter described the switch device of the invention is disclosed relative to switching video signals. A typical use of the switch of the invention may be found in programming equipment for television stations wherein the two video signals represent the signal being broadcast and the signal next to be broadcast as developed from different sources. These sources may include one source from a network program received by the station and a local advertising program generated on a film island within one of the studios of the station. In order to effectively program the various sources onto transmitting equipment an operator must very accurately, at a specific time, switch the on air or live program off and bring the preset program on line. In many instances the removal of a given program from line does not mean that the program is terminated, but rather that it is switched onto monitoring receiver equipment within the station to be switched back on line at the end of the advertisement then placed on line. It is quite important that the switch structure utilized to accomplish this function be capable of responding quickly in order to preclude loss of video from either channel and on proper cue. The switching function should be carried out with a minimum of bounce which will be seen by television viewers. The switching speed must in certain instances, be fast enough to permit switching during the vertical blanking interval responsive to a synchronizing clock signal which automatically times the switching operation even though it is initiated by manual control. Relative to FIGURE 5, this means that the contacts CT1–CT4 must be capable of being opened or closed quickly without bounce or with minimum bounce responsive to a control signal. Since whatever takes place may be actually viewed by a large number of televison viewers it is equally important that the signals passing through the channel paths of the switch be isolated from each other except during overlap, and from any stray radiation developed by either the control signals or circuits proximate to the switch. This isolation is especially critical in color television because subcarriers may interact causing degradation. In other words, it is important that when the switch is operated, for example, so that $I_{IN}$ is connected to $I_{OUT}$ and $II_{IN}$ is connected to $II_{OUT}$, portions of the $I_{IN}$ or $II_{IN}$ signals do not leak across to the other channel path. It is also important that when the contacts are open the particular signals on the IN channel paths do not leak across to appear on the OUT channel paths. By way of example the isolation between the channels shown in FIGURE 1 is desirably greater than 60 db at 5 mHz. This isolation is measured by a ratio of the voltage level in to the voltage level out between the various channel paths in various conditions of operation. It is also important that coupling through the control circuit paths which serve to operate the contacts as shown in FIGURE 5 not operate to affect isolation and that control signals not be coupled into the channel paths.

Figure 2:
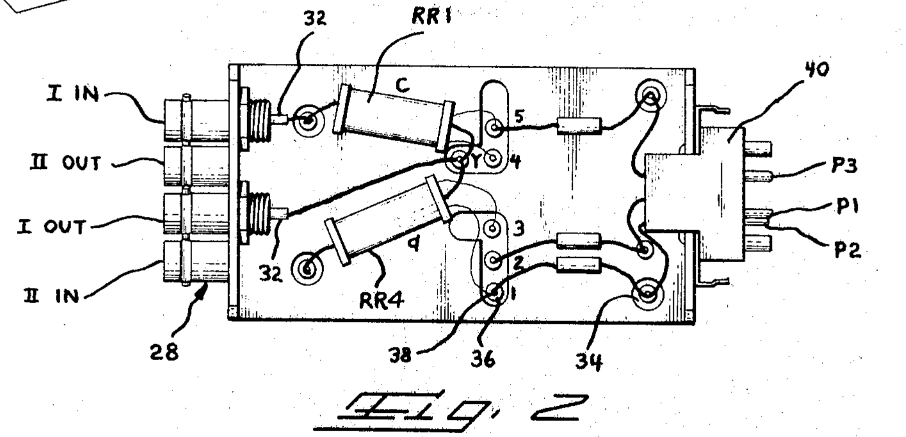
FIGURE 2 is a plan view showing the top of the switch structure of FIGURE 1.
Figure 3:
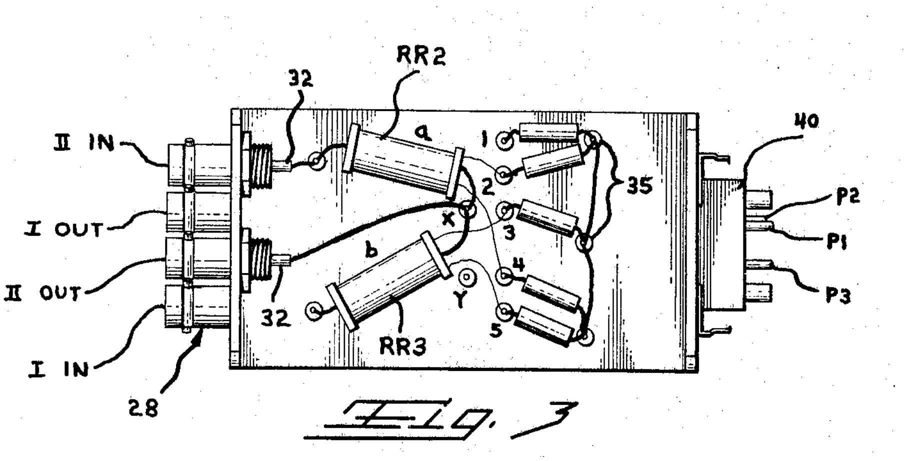
FIGURE 3 is a plan view from the bottom of the switch structure shown in FIGURE 1.

Referring now to FIGURES 1–3 the switch structure of the invention is shown as 10 to include a switch chassis 12 and a shielding can 14 having an inside cavity 16 to fit over the chassis 12 and to be secured thereto to shield the chassis from receiving or emitting radiation. The chassis 12 includes a frame 18 comprised of members 20 preferably formed of sheet metal each having a flat center portion 22 for accommodating switch components and turned up portions 24 and 26 at the ends for accommodating connectors for the assembly. The connectors for video signals are shown as 28 and are standard BNC terminal connectors each including an outer conductive shell supporting a dielectric insert and a center contact member; the shell being shown as 30 and the contact member being shown as 32 in FIGURE 1. The connectors 28 are secured and grounded to the members 20 with one pair for each of the members and with the pairs staggered as indicated in FIGURE 1. The upper pair of connectors 28 define $I_{IN}$ and $I_{OUT}$ and the lower pair define the $II_{OUT}$ and $II_{IN}$. The upper member 20 includes a series of apertures shown as 34 through which conductive posts are fitted. Certain of the posts shown as 35 are mechanically and electrically connected to the lower member 20 and thus to the ground plane formed by the members. Others of the posts include an insulated bushing such as 36 isolating a conductive post such as 38 mechanically securing the posts to the members 20 but isolating the posts from electrical connections therewith. At the right hand end of the chassis 12 in the upper member 20 is a connector 40 carrying a series of contact pins P1–P3 which provide circuit paths for control signals to control the switches of the device. The connector is of a standard pin and socket construction and is anchored to the chassis in the manner indicated. The shielding can 14 includes an aperture not shown in the right hand end of the can through which is fitted the connector 40.

Figure 4:
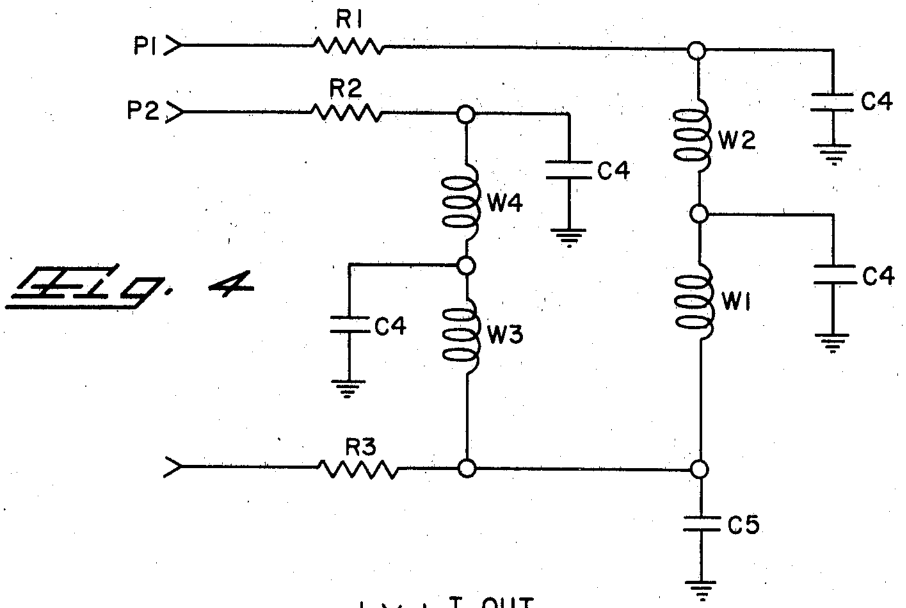
FIGURE 4 is a schematic diagram of the control circuit of the switch of the invention.

Leads from the pins P1–P3 forming the control circuit of the device are carried as indicated in FIGURES 1–3 to various terminal posts and components. FIGURE 4 shows schematically these components including a series of resistors R1–R3 which are given values forming a resistance small enough to provide adequate current flow and large enough to form part of an RC network for filtering out high frequencies which might be impressed upon the control circuit from extraneous sources. The C for the RC network is supplied by the capacitors C4 and C5 which also serve an additional purpose to be hereinafter detailed. In FIGURE 4 the elements identified as W1–W4 represent the windings for four reed switches having the contacts CT1–CT4 as shown in FIGURE 5. The reed switches are shown in FIGURES 1–3 as RR1–RR4.

The relays are standard dry reed relays comprised of a set of overlapping contacts made of a permeable material such as soft iron and biased to overlap in an open position when not energized. The contacts are carried in a glass envelope and are surrounded by a plastic winding yoke around which is wrapped a number of turns forming the winding for the relay. The winding for reeds of this type is a fine Formvar coated 39 AWG wire. When energized the winding causes the contacts to close and complete a circuit path through the relay. In an actual embodiment the relays employed were Hamlin Co. No. MSRS–2–Form A. These relays have a winding impedance of about 100Ω.

In accordance with the invention the relays are positioned on the chassis 12 relatively away from the circuit paths and components of the control circuit and close to the BNC connectors 28. As can be discerned from FIGURES 1–3 two of the relays are positioned on one side of the ground plane formed by the members 20 and two are positioned on the other side. In each instance the relays are positioned so that the lead paths from an input to the contacts of a reed are quite short eliminating as much as possible problems of radiation by/or to the circuit path formed thereby. The leads from the output side of the relay to a given output are maintained as short as possible considering that two reed relays share a given output path. FIGURE 2 shows RR1 and RR4 to be connected in common to a lead going to the $I_{OUT}$ path and FIGURE 3 shows RR2 and RR3 to be similarly connected to the $II_{OUT}$ path. In each instance the longer span connecting a pair of relays to a given output is made to be as short as possible and the two spans are on opposite sides of the ground plane defined by members forming 20. The signals channeled through the contacts CT1 and CT2 are thus isolated and shielded each from the other signal paths as indicated by the dotted line in FIGURE 5. The channel paths connected together upon closure of CT3 and CT4 are similarly isolated by reason of the position of the relay relative to the ground plane formed by members 20. Again, and in each instance, the relatively long span of lead for each channel path is isolated from the other but is from the span of the other channel path.

Figure 6:
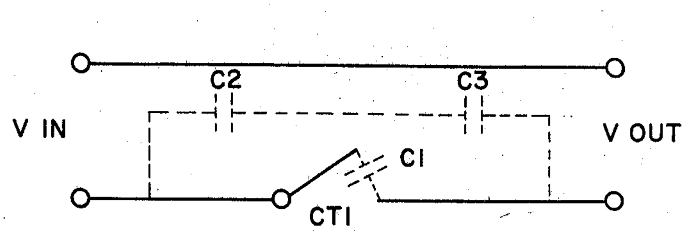
FIGURES 6 and 7 are equivalent circuits included to explain one aspect of isolation provided by the circuit of the invention.
Figure 7:
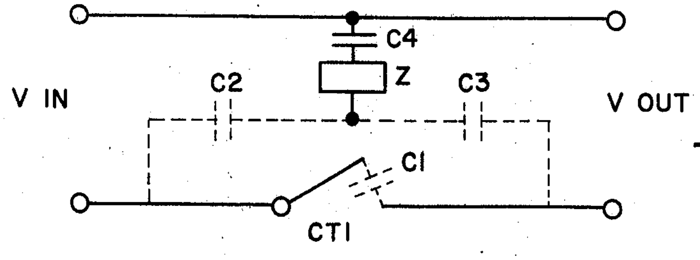

As another point of advantage relative to the packaging technique of the invention, the windings for the coil relays RR1–RR4 are terminated to the energizing circuit through the leads which are made as short as possible. These leads are the fine leads shown to the right of each of the relays in FIGURES 2 and 3. The reason for maintaining these lead lengths as short as possible can be appreciated from FIGURES 6 and 7. Viewing FIGURE 6 as representing the signal paths for relay RR1 there exists when the contacts CT1 are open a capacitive coupling represented as C1 which can be thought of as providing isolation for the open circuit condition of the relay. In fact there is a parallel path indicated as dotted in FIGURE 6 including the air gap between the bodies of the contacts of the relay, the glass envelope surrounding such contact and the windings surrounding the envelope and the contacts along a substantial portion of the length thereof. The capacitors C2 and C3 represent this path from the contacts to the windings and across the contacts effectively coupling the voltage present on the input channel to the output path. In accordance with the invention a capacitor C4 is provided for each winding W1–W4 connected in the manner indicated in FIGURE 7 coupling this shunt path to ground. The impedance denominated Z represents the impedance of the short length of the lead from each of the windings to ground. As can be discerned from FIGURE 3 each of the leads is connected through a capacitor C4 to a ground. In accordance with the invention Z is made to be as small as practically possible relative to the impedance of the path including C2 and C3. The path including Z and C4 inserted in the circuit effectively couples the shunt path to ground relative to high frequency signals improving the isolation of the reed and the circuit in the open circuit condition.

In an actual embodiment utilizing the reed relays identified previously the capacitors C4 and C5 were rated at 0.047$\mu$f. and the resistors R1 and R2 were 560 ohms. The resistor R3 was 330 ohms. The applied control voltage was 24 volts nominal at a normal operating control current of 15 milliamps which was increased to 30 milliamps during lap switching. Measured isolation between channels was 60 decibels at 5 mhz. The switch was roughly 4.5 by 2 x 1.5 inches in dimension and weighed approximately 140 grams.

It is to be appreciated that the foregoing actual embodiment represents a compact high isolation all shielded 2 x 2 switch.

Having now defined the invention in terms intended to enable the preferred practice thereof I define what is believed to be inventive through the appended claims.

What is claimed is:

1. In a device for switching high frequency signals a shielded input path and a shielded output path, means for mounting said paths, said means defining a ground plane, a reed relay affixed to said mounting means with one end adjacent to said input path and the other end connected to said output path by a relatively heavy low resistance bus, said relay including a winding coil operable when energized to close the contacts thereof to connect said input path to said output path, means for improving isolation between said paths when said contacts are open including a circuit path connecting each end of said winding through a capacitor to ground to minimize shunt coupling through said winding across said contacts.

2. In a device for switching high frequency signals a plurality of input paths and a plurality of output paths, a plurality of relays for interconnecting input paths to output paths and control circuit means for energizing said relays, mounting means for said elements defining a ground plane, said relays being arranged on said mounting means so that pairs of input and output paths are on opposite sides of said ground plane to provide isolation between signal channels in said device defined by operation of pairs of said relays.

3. The device of claim 2 wherein said control circuit means is connected to energize a pair of said relays by a single control signal, the said pair of said relays being on opposite sides of said ground plane.

4. The device of claim 3 wherein there is provided means for increasing isolation between input paths and output paths when said relays are in an open circuit condition including a high frequency shunt path to ground connected to each end of the wnding of each relay.

5. The device of claim 4 wherein there are four relays and five high frequency shunt paths to ground.

6. In a compact switch device for switching high frequency signals, a mounting means defining a ground plane, a shielding structure surrounding said mounting means, a plurality of input and output connectors affixed to said mounting means at one end thereof and connector means at the other end thereof carrying control circuit leads for the control signals of a control circuit means, a plurality of relays secured to said mounting means with pairs of said relays on one side of the ground plane and pairs on the other side thereof, said relays being mounted adjacent said input and output connectors with the contacts thereof connected to said connectors by relatively heavy low resistance buses of relatively short span, to form an input and output circuit, said control circuit means including a plurality of elements physically located on said mounting means toward the end opposite said relays with the physical position of the leads thereof arranged to minimize cross coupling between the control circuit means and the input and output circuit.

7. The device of claim 6 wherein the said elements including said relays and the components of said control circuit means are physically oriented to minimize path lengths.

8. In a device for switching high frequency signals, a shielded input path and a shielded output path, means for mounting said paths, at least one relay affixed to said mounting means with one end adjacent to said input path and the other end connected to said output path, said at least one relay including a winding operable when energized to close the contacts thereof to connect said input path to said output path, and means for improving isolation between said paths when said contacts are open including a shunt circuit path connecting each end of said winding through a capacitor to ground to minimize undesired coupling through said winding across said contacts.

9. A high frequency switch device comprising at least one input path and at least one output path, means for mounting said paths, relay means connected between said input and output paths, said relay means including contacts separately connected to said paths and driving coil means for closing said contacts when energized to connect said input and output paths, means to energize said coil means, and means for providing an improved isolation between said contacts when in the open condition including a circuit path from each end of said coil means to ground to provide a shunt path to ground of any input signal and thus minimize shunt coupling through the coil means and across said contacts.

References Cited

UNITED STATES PATENTS

| | | | |
|---|---|---|---|
| 3,086,178 | 4/1963 | Boyd | 333—9 X |
| 3,087,125 | 4/1963 | Scholefield | 335—5 X |

ROBERT K. SCHAEFER, Primary Examiner

H. J. HOHAUSER, Assistant Examiner

U.S. Cl. X.R.

317—101; 333—9; 335—5